(12) United States Patent
Schandel et al.

(10) Patent No.: US 7,872,214 B2
(45) Date of Patent: Jan. 18, 2011

(54) KITCHEN APPLIANCE FOR COOLING AND/OR HEATING FOODSTUFF

(75) Inventors: David Schandel, Richmond, VA (US); Jim Gaynor, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 455 days.

(21) Appl. No.: 11/955,131

(22) Filed: Dec. 12, 2007

(65) Prior Publication Data

US 2009/0152258 A1    Jun. 18, 2009

(51) Int. Cl.
 *F27D 11/00* (2006.01)
 *A01J 15/02* (2006.01)

(52) U.S. Cl. .................. 219/385; 219/439; 219/474; 219/620; 99/465; 99/470; 99/484

(58) Field of Classification Search ............ 219/385, 219/439, 620, 474; 99/465, 470, 484
See application file for complete search history.

(56) References Cited

U.S. PATENT DOCUMENTS

| | | | |
|---|---|---|---|
| 2,504,794 A | 4/1950 | Berman et al. | |
| 6,121,593 A | 9/2000 | Mansbery et al. | |
| 6,574,967 B1 | 6/2003 | Park et al. | |
| 6,612,115 B2 | 9/2003 | Luo | |
| 6,735,958 B2 | 5/2004 | Baumann | |
| 7,117,937 B2 | 10/2006 | Clark | |
| 7,174,720 B2 * | 2/2007 | Kennedy | ............ 62/3.3 |
| 2002/0179588 A1 | 12/2002 | Lubrina | |

* cited by examiner

*Primary Examiner*—Shawntina Fuqua
(74) *Attorney, Agent, or Firm*—Panitch Schwarze Belisario & Nadel LLP

(57) ABSTRACT

A kitchen appliance for cooling and heating foodstuff including a housing that defines a cooling and heating cavity within the housing. A container is removably mountable within the cooling and heating cavity of the housing and the container is capable of retaining foodstuff therein. A conduction plate is disposed within the housing. The conduction plate is in thermal engagement with the container when the container is mounted within the housing. A heating element is disposed within the housing and is in thermal engagement with a conduction plate to heat the cooling and heating cavity. A cooling element is disposed within the housing and is in thermal engagement with the conduction plate to cool the cooling and heating cavity.

15 Claims, 3 Drawing Sheets

KITCHEN APPLIANCE FOR COOLING AND/OR HEATING FOODSTUFF

BACKGROUND OF THE INVENTION

The present invention is directed to a kitchen appliance configured to cool and/or heat foodstuff and, more particularly, to a slow cooker or other such kitchen appliance configured both to cool foodstuff for an extended period of time and/or cook foodstuff at an elevated temperature for an extended period of time.

Slow cookers and other such kitchen appliances are generally known. Slow cookers typically include an outer base, a container removably positioned within the outer base and a lid removably mounted to the top of the container or the outer base to enclose the container within the outer base. The housing typically has an electrically-operated control and heating element(s) for heating foodstuff placed within the container. Typical slow cookers require the user or consumer to set a timer mounted on the exterior of the outer housing to control the length of time for which the slow cooker heats and cooks the foodstuff within the container.

When a user or consumer desires to cook foodstuff within a typical slow cooker, it is usually necessary to preserve the uncooked foodstuff within a separate refrigerator or other such device to preserve the foodstuff until the consumer or user is ready to cook the foodstuff within the slow cooker. Therefore, if a consumer or user prepares foodstuff in advance, it is necessary for the user to place the prepared foodstuff within the refrigerator for an extended period of time to preserve the foodstuff before cooking it in the slow cooker.

Therefore, it would be desirable to provide a device that would allow a user to preserve cooled foodstuff within the container of the slow cooker for an extended period of time while the user is unable to attend to the foodstuff and to automatically actuate a cooking cycle of the slow cooker to begin cooking the foodstuff at some point in the future. For example, it would be desirable to allow a user such that prior to going to bed or leaving for work, the user may place foodstuff within the container of the slow cooker and place the slow cooker within the outer housing. This device could then be programmed to chill the foodstuff or maintain cold foodstuff in a chilled condition for a preset amount of time and begin a cooking cycle at the conclusion of this preset amount of time. Thus, it would be desirable to include a chilling cycle within a slow cooker to aide in preserving the foodstuff while the user is unable to attend to the foodstuff or before it is desired that the cooking begins.

BRIEF SUMMARY OF THE INVENTION

Briefly stated, the present invention is directed to a kitchen appliance for cooling and heating foodstuff. The appliance includes a housing having a base and a side wall extending therefrom to define a cooling and heating cavity therein. The housing further has a housing rim defining an opening to the cooling and heating cavity. A container is removably mountable within the housing. The container has a generally hollow interior and a container rim defining an opening for accessing the interior thereof. The interior is capable of retaining foodstuff therein and the container is sized and shaped to fit within the cooling and heating cavity. A lid is removably mountable to the housing rim of the housing. The lid is sized and shaped to cover the opening of the container when placed on the housing rim. A heating element is disposed within the housing sufficiently proximate to the cooling and heating cavity to heat the cooling and heating cavity. A cooling element is disposed within the housing sufficiently proximate to the cooling and heating cavity to cool the cooling and heating cavity.

In another aspect, the present invention is directed to a kitchen appliance for cooling and heating foodstuff. The appliance includes a housing that defines a cooling and heating cavity therein. A container is removably mountable within the cooling and heating cavity and the container being capable of retaining foodstuff therein. A conduction plate is disposed within the housing in thermal engagement with the container when the container is mounted within the housing. A heating element is disposed within the housing and is in thermal engagement with a conduction plate to heat the cooling and heating cavity. A cooling element is disposed within the housing and is in thermal engagement with the conduction plate to cool the cooling and heating cavity.

In a further aspect, the present application is directed to a method of cooling and heating foodstuff in a kitchen appliance over a period of time. The kitchen appliance includes a housing defining a cooling and heating cavity therein, a controller to control cooling and heating of the cooling and heating cavity, a display in communication with the controller, a container removably mountable within the cooling and heating cavity, the container being capable of retaining the foodstuff therein, a heating element disposed within the housing to heat the cooling and heating cavity and at least one cooling element disposed within the housing to cool the cooling and heating cavity. The method includes the steps of inserting foodstuff into the container, positioning the container in the cooling and heating cavity, selecting an operating mode on the display to operate the kitchen appliance in a program mode, selecting a heating duration time on the display to operate the heating element for the heating duration time, selecting an operation sequence on the display to operate the at least one cooling element before operating the heating element, selecting a cooling duration time on the display to operate the cooling element for the cooling duration time, automatically actuating the cooling element to cool the cooling and heating cavity for the cooling duration time, automatically actuating the heating element when the cooling duration time is complete to heat said cooling and heating cavity for said heating duration time and automatically cutting power to the heating element after a maximum time elapses.

BRIEF DESCRIPTION OF THE SEVERAL VIEWS OF THE DRAWINGS

The foregoing summary, as well as the following detailed description of a preferred embodiment of the present invention, will be better understood when read in conjunction with the appended drawings. For the purpose of illustrating the invention described in the present application, there is shown in the drawings, an embodiment which is presently preferred. It should be understood, however, that the invention is not limited to the precise arrangements and instrumentalities shown. In the drawings.

DETAILED DESCRIPTION OF THE INVENTION

Figure 1:
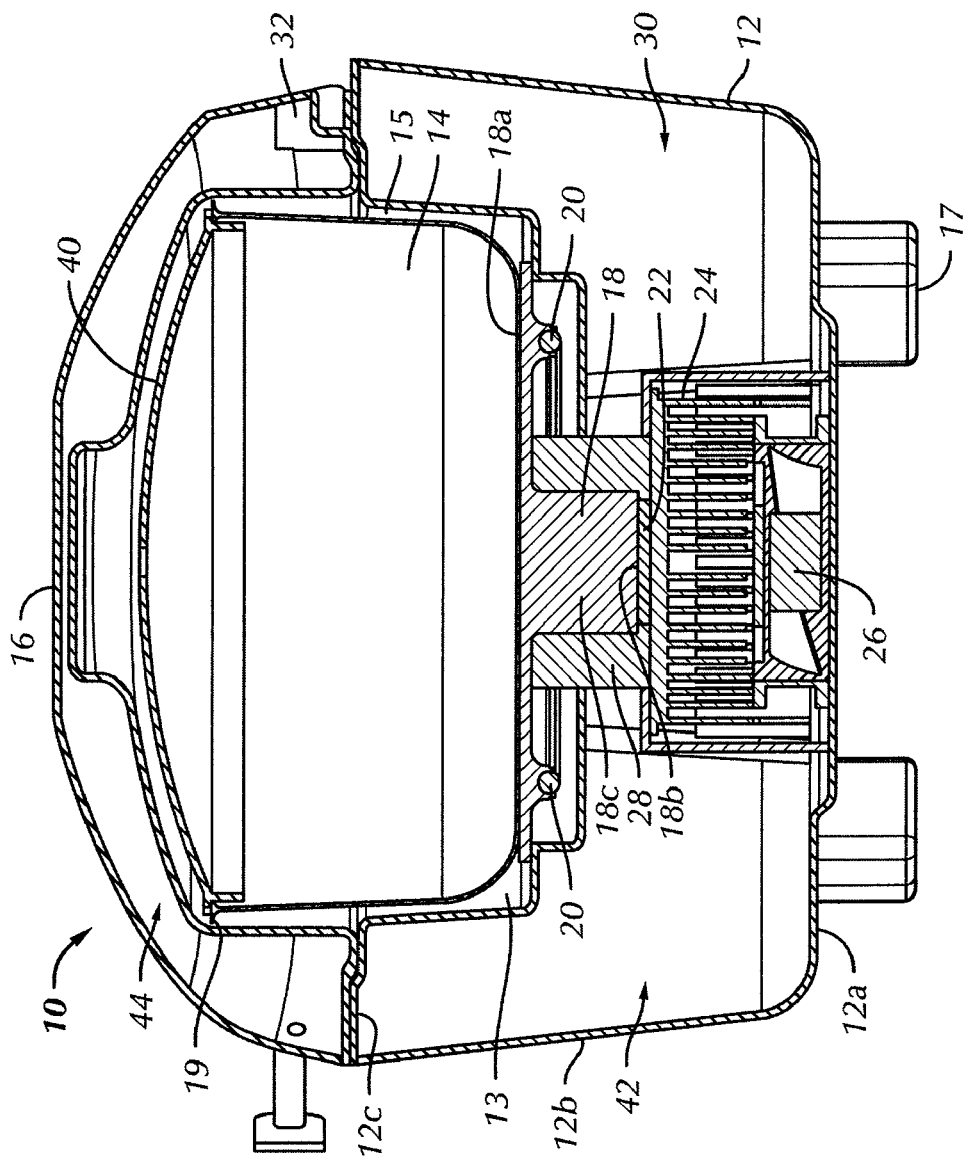
FIG. 1 is a sectional front elevation view of a preferred embodiment of a kitchen appliance in accordance with the present invention.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the kitchen appliance and designated parts thereof. The terminology includes the above-listed words, derivatives thereof and words of similar import.

Figure 2:
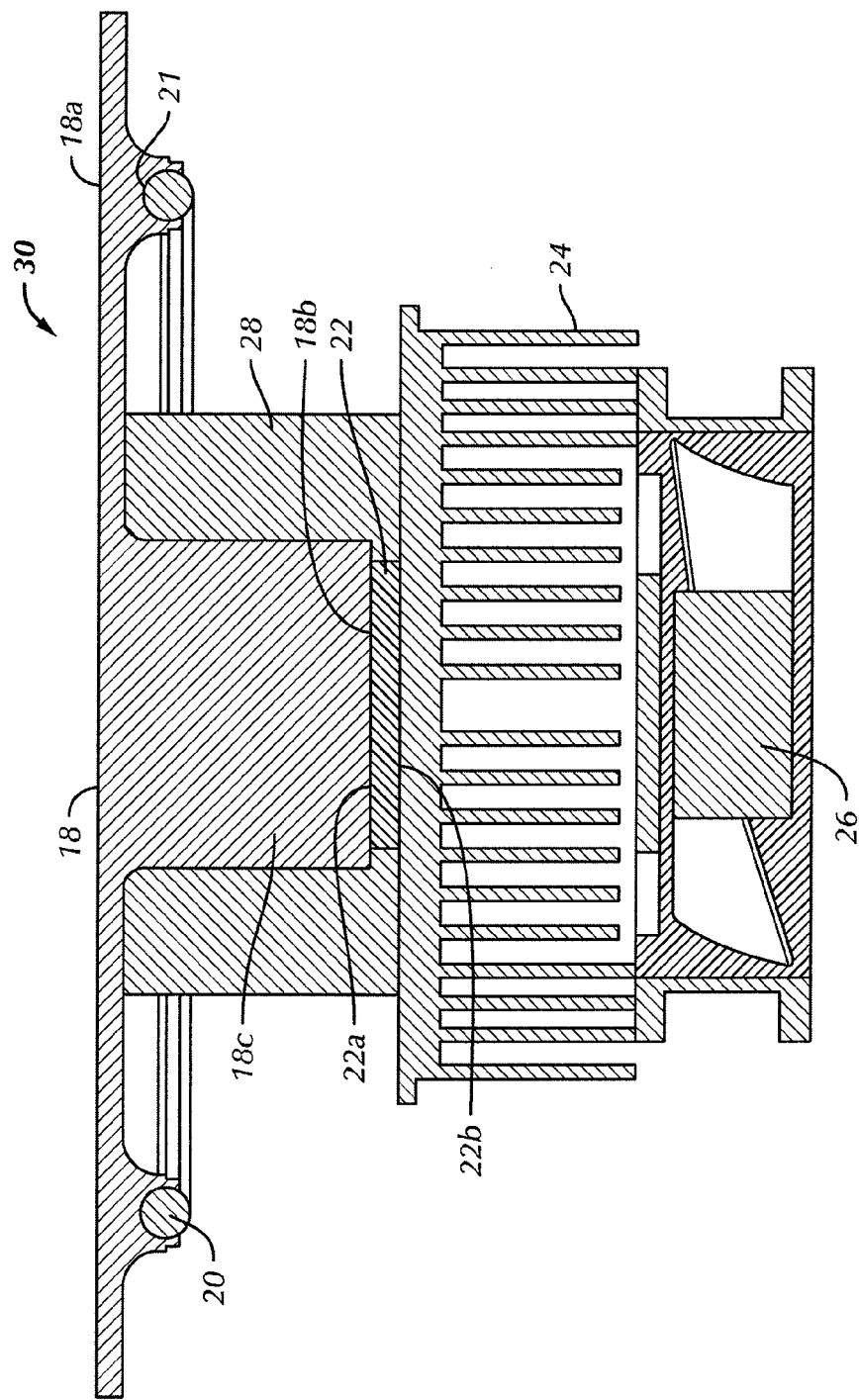
FIG. 2 is an enlarged sectional front elevation view of a subassembly of the kitchen appliance shown in FIG. 1.

Referring to the drawings in detail, wherein like numerals indicate like elements throughout, there is show in FIGS. 1-2 a preferred embodiment of a kitchen appliance, generally indicated at 10, for cooling and heating foodstuff (not shown). The kitchen appliance 10 of the present invention allows a user to preserve foodstuff inside a container 14 of the kitchen appliance 10 in a cooled state for an extend period of time while a user is unable to attend to the foodstuff and later the kitchen appliance 10 automatically actuates a cooking cycle to heat the foodstuff. Alternatively, the kitchen appliance 10 allows a user take already cooled foodstuff, such as from a refrigerator, and begin heating or cooking the foodstuff immediately and after cooking is complete, the foodstuff may be cooled to prevent over-cooking and/or to preserve the foodstuff. The kitchen appliance 10 is preferably in the form of a conventional slow cooker, but could be other products such as a skillet, grill, food processor or any other refrigeration or cooking device that may be capable of cooling and heating foodstuff therein.

Referring to FIG. 1, the kitchen appliance 10 includes a housing 12 having a base 12a and a generally continuous side wall 12b extending upwardly therefrom to define a cooling and heating cavity 13 within the housing 12. The housing 12 further includes a housing rim 12c on the upper edge of the sidewall 12b that defines an opening 15 of the cooling and heating cavity 13. Preferably, housing insulation 42 fills the internal empty spaces of the housing 12 between the housing rim 12c, the sidewall 12b and the heating and cooling cavity 13. The housing insulation 42 may be formed of virtually any insulating material, such as a fire-resistant foam material, without departing from the spirit and scope of the invention. Further, it is understood by those skilled in the art that the present invention is not limited to the inclusion of the housing insulation 42. Preferably, the housing 12 is generally circular in shape when viewed from above or below with the side wall 12b extending generally perpendicularly upward therefrom. While the circular shape is preferred, it is within the spirit and scope of the present invention that the housing 12 a different shape, such as, but not limited to, an ovular shape, a square shape or a rectangular shape.

Preferably, the housing 12 includes at least two generally spaced apart protrusions or feet 17 extending downwardly from a bottom surface of the base 12a for supporting the kitchen appliance 10 on a support surface, such as a kitchen counter (not shown), and preferably spacing the bottom of the base 12a of the housing 12 slightly from the surface. While it is preferred that the kitchen appliance 10 includes at least two feet 17, is within the spirit and scope of the present invention that there be more or less then two feet 17 and that the feet 17 be shaped differently, provided that the feet 17 are capable of functioning in the manner described above. Additionally, it is contemplated that the kitchen appliance 10 includes no feet and that the kitchen appliance 10 be supported by the base 12a on the surface. Preferably, the components of the housing 12 are formed from metallic materials, such as aluminum, stainless steel or other suitable metallic material or some combination of metallic materials. However, it is within the spirit and scope of the present invention that one or more of the components of the housing 12 be formed from other non-metallic materials, providing the housing 12 the capability of functioning as described above.

The kitchen appliance 10 further includes a container 14 removably mountable within the housing 12. The container 14 has a generally hollow interior and a container rim 19 defining an opening for accessing the interior thereof. The interior of the container 14 is capable of retaining foodstuff therein. The container 14 is sized and shaped to fit within the cooling and heating cavity 13 of the housing 12. The container 14 is preferably made of metallic material, such as aluminum. While an aluminum container is preferred, it is within the spirit and scope of the present invention that the container 14 be made of a different material, such as cast iron with a porcelain enamel coating, stoneware or ceramic, for instance, provided the container 14 is capable of functioning as described herein. Additionally, it is preferable that the container 14 be easily removable from the housing 12 to facilitate cleaning thereof without exposing the housing 12 or interior components of the housing 12 to water and/or cleaning detergents or solvents.

Preferably, the container 14 includes a container lid 40 removably mountable on the container rim 19. It is understood by those skilled in the art that the container lid 40 may be separate and independent from the container 14 or that the container lid 10 may be pivotably or hingedly mounted to the container 14. The container lid 40 is generally sized and shaped to enclose the hollow interior of the container 14 and fully cover the container rim 19. It is within the spirit and scope of the present invention that the container lid 40 be made of virtually any material, but preferably a stoneware, ceramic, metallic or polymeric material and be in virtually any size and shape such that the container lid 40 is large enough to enclose the container 14 and small enough to fit within the kitchen appliance 10. Further, it is understood by those skilled in the art that the kitchen appliance 10 is not limited to the inclusion of a container lid 40 and may function without a container lid 40.

The kitchen appliance 10 includes a lid 16 removably mountable to the rim 12c of the housing 12. The lid 16 is sized and shaped to fully cover the opening 15 of the housing 12 when the lid 16 is placed on the housing rim 12c. Preferably, lid insulation 44 fills the internal space of the lid 16. The lid insulation 44 may be formed of virtually any insulating material, such as a fire-resistant foam material, without departing from the spirit and scope of the invention. Further, it is understood by those skilled in the art that the present invention is not limited to the inclusion of lid insulation 44. Preferably, the lid 16 includes a lid hinge 32 on an outer edge thereof for pivotal engagement of the lid 16 with the housing rim 12c. However, it is within the spirit and scope of the invention that the kitchen appliance 10 of the present invention does not include the lid hinge 32 such that the lid 16 may be completely separated from the housing 12 for cleaning purposes or for ease of inserting the foodstuff within the kitchen appliance 10.

The lid 16 is preferably shaped to match the shape of the housing 12 when viewed from above or below. However, it is understood by those skilled in the art that the shape of the lid 16 may be modified to virtually any shape, such as triangular or rectangular, so long as the lid 16 can properly enclose the cooling and heating cavity 13 without departing from the spirit and scope of the invention. The lid 16 is preferably formed of a metallic material to match the material used to construct the housing 12. However, it is understood by those skilled in the art that the lid 16 may be made of a glass material or a polymeric material such that lid 16 is generally transparent and exhibits greater insulating characteristics. Further, it is understood by those skilled in the art that the lid 16 or the base 12 may include one or more handles (not shown) to assist a user in moving or placing the kitchen appliance 10. It is within the spirit and scope of the invention that the lid 16 may be formed with a ring (not shown) disposed around an outer periphery thereof to retain a gasket (not shown). It is understood by those skilled in the art that the ring and gasket would function to sealingly engage the lid 16 with the container rim 12*c* when the lid 16 is placed thereon.

Referring to FIGS. 1-2, the kitchen appliance 10 includes a subassembly 30 to cool and heat foodstuff therein. Preferably, the subassembly 30 includes a conduction plate 18 disposed within the housing 12. The conduction plate has a first, generally flat upper surface 18*a* and a second, lower surface 18*b*. The conduction plate 18 is in thermal engagement with the container 14 when the container 14 is placed within the housing 12. Preferably, the conduction plate 18 is located at a lower portion of the cooling and heating cavity 13 such that a lower surface of the container 14 rests on the first, generally flat upper surface 18*a* of the conduction plate 18 when the container 14 is placed within the housing 12. The lower surface of the container 14 is generally flat to maximize the thermal contact and thermal conduction with the conduction plate 18. The first, generally flat upper surface 18*a* of the conduction plate 18 is preferably circular in shape to match the shape of the lower surface of the container 14. However, it is within the spirit and scope of the invention that the shape of the conduction plate 18 when viewed from above can be in the form of virtually any shape such as rectangular or ovular without departing from the spirit and scope of the invention.

Further, the conduction plate 18 includes a central portion 18*c*, or cold block, that connects the first, upper surface 18*a* to the second, lower surface 18*b* such that temperature changes may be transferred between the two surfaces 18*a*, 18*b*. Preferably, the central portion 18*c* is cast integral to the first, upper surface 18*a*. However, it is understood by those skilled in the art that the conduction plate 18 may include two or more central portions 18*c*, or cold blocks, separately or touchingly mounted below the first, upper surface 18*a*. The conduction plate 18 is preferably formed of any material capable of quickly and efficiently transferring temperature changes, such as a metallic material. However, it is within the spirit and scope of the invention that the conduction plate 18 be formed of an alternative conducting material without departing from the spirit and scope of the invention.

When viewed from the side (FIGS. 1 and 2), a guide groove 21 is located on and integrally formed with the conduction plate 18 below a portion of the first, upper surface 18*a*. Preferably, the guide groove 21 is sized and shaped to partially enclose a heating element 20. However, it is understood by those skilled in the art that the kitchen appliance 10 of the present invention is not limited to a guide groove 21 and the guide groove 21 is not limited to the size and shape as depicted in the attached figures.

The heating element 20 is disposed within the housing 12 sufficiently proximate to the cooling and heating cavity 13 to heat the cooling and heating cavity 13. Preferably, the heating element 20 is a heating coil. However, it is within the spirit and scope of the invention that the heating element 20 of the kitchen appliance 10 of the present invention be in the form of virtually any type of conventional resistant-type heating element, such as a cal-rod or mica board heating element, without departing from the spirit and scope of the invention. Those skilled in the art would understand that is within the spirit and scope of the present invention that a different type of heating element be used provided that the heating element 20 functions to heat the cooling and heating cavity 13 of the housing 12. Further, the kitchen appliance 10 may include two or more heating elements 20 without departing from the spirit and scope of the present invention.

Preferably, the heating element 20 is disposed within the housing 12 and is in thermal engagement with the conduction plate 18. Although, it is within the spirit and scope of the present invention that the heating element 20 be located within or on the side wall 12*b* of the housing 12 in addition to or instead of within the housing 12. Specifically, the heating element 20 of the present invention is located within the groove 21 of the conduction plate 18. This configuration allows the heating element 20 to generally heat the entire first, upper surface 18*a* of the conduction plate 18 to heat and cook the foodstuff within the container 14.

The kitchen appliance 10 further includes at least one cooling element 22 disposed within the housing 12 sufficiently proximate the cooling and heating cavity 13 to cool the cooling and heating cavity 13. The at least one cooling element 22 is preferably in the form of a thermal electric cooling module (TEC). Although such a cooling element 22 is preferred, it is within the spirit and scope of the present invention that a different type of cooling element 22 be used, provided the at least one cooling element 22 functions to cool the cooling and heating cavity 13 of the housing 12. In the preferred embodiment, the cooling element 22 is positioned in good thermal contact with the second, generally flat lower surface 18*b* of the conduction plate 18. A first, upper surface 22*a* of the cooling element 22 is capable of cooling the conduction plate 18 at the second, lower surface 18*b*. This decreased temperature is transferred from the second, lower surface 18*b* to the first, upper surface 18*a* such that the first, upper surface 18*a* of the conduction plate 18 provides a chilling or cooling effect to the foodstuff within the container 14.

A second, lower surface 22*b* of the cooling element 22 removes heat generated by the cooling element 22 away from the cooling and heating cavity 13. Preferably, the cooling element 22 is generally disposed directly beneath the conduction plate 18 and is sized and shaped to generally match the size and shape of the central portion 18*c* of the conduction plate 18. However, it is understood by those skilled in the art that the size, shape and location of the cooling element 22 can be modified without departing from the spirit and scope of the invention. For example, the cooling element 22 may be located within or on the side wall 12*b* of the housing 12 in addition to or instead of beneath the conduction plate 18. Further, it is understood by those skilled in the art that the kitchen appliance 10 may include two or more cooling elements 22, such as two separate TEC modules, without departing from the spirit and scope of the present invention. Providing additional cooling elements 22 would increase the rate at which the one or more central portions 18*c*, or cold blocks, of the conduction plate 18 could be cooled.

The kitchen appliance 10 further includes a heat sink 24 to dissipate heat produced from the second, lower surface 22*b* of the cooling element 22 or alternatively absorb heat expelled from the thermal electric cooling module. It is understood by those skilled in the art that the heat sink 24 may be in the form of virtually any device that is capable of absorbing and dissipating heat produced from another object or device. Preferably, the heat sink 24 is located directly beneath the lower, second surface 22*b* of the heating element to increase the efficiency from which heat is removed from the cooling element 22. Further, the heat sink 24 has a larger circumference than that of the cooling element 22 to allow the heat sink 24 to remove heat generated by the heating element within the housing 12. However, it is understood that the size, shape and location of the heat sink 24 is not limited to the embodiment described above. For example, the heat sink 24 may be located within or on the side wall 12b of the housing 12 in addition to or instead of within the housing 12.

Further, the kitchen appliance 10 of the present invention includes a fan 26 to dispel hot or relatively warm air that accumulates in or around the heat sink 24. Preferably, as shown in FIGS. 1 and 2, the fan 26 is located directly below the heat sink 24 to blow air from outside the kitchen appliance 10 into the housing 12 and up to the heat sink 24. However, it is understood by those skilled in the art that the fan 26 of the present invention may be oriented to expel heat built-up in the heat sink 24 and in the lower portion of the housing 12 away from and outside of the housing 12. Alternatively, the fan 26 may be situated next to or adjacent to the heat sink 24 to redirect airflow so that relatively cool air blows across the heat sink 24 to lower the temperature of the heat sink 24. The fan 26 may be in the form of virtually any kind of heat removal or air circulation device without departing from the spirit and scope of the invention.

Further, the present invention includes insulation 28 to enclose at least a portion of the conduction plate 18 to maintain a desired temperature of the conduction plate 18. Specifically, insulation 28 encloses circumferentially the central portion 18c of the conduction plate 18 and is generally sandwiched between the second, lower surface 18b of the conduction plate and the heat sink 24. However, it is understood by those skilled in the art that the size, shape and location of the insulation 28 be modified without departing from the spirit and scope of the invention. The insulation 28 may be formed of virtually any insulating material, such as a fire-resistant foam material, without departing from the spirit and scope of the invention. Further, it is understood by those skilled in the art that the present invention is not limited to the inclusion of insulation 28.

Preferably, a control knob (not shown) extends outwardly from the side wall 12b of the housing 12 to enable a user to control the heating element 20 and the cooling element 22. For instance, it is preferred that location of the control knob by the user toggles the operation of the heating element 20 and the cooling element 22 between on and off positions. Further, it is understood by those skilled in the art that the present invention may include a timing device (not shown) that controls when the heating element 22 turns on and off and when the cooling element 22 turns on and off.

Figure 3:
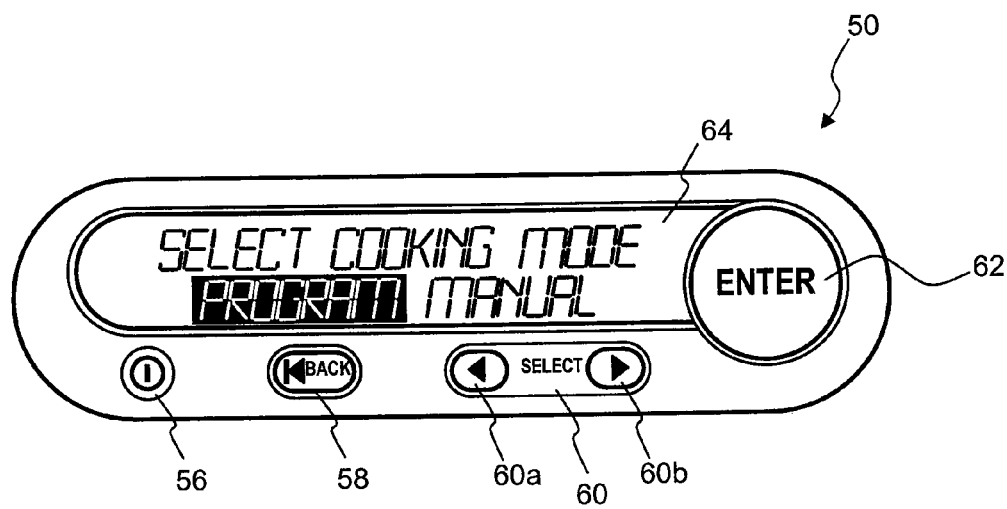
FIG. 3 is a front elevation view of a display or control interface of the kitchen appliance shown in FIG. 1.

In operation, a user mounts the housing 12 on a surface, such as a countertop or tabletop. The user then properly supplies power to the kitchen appliance 10 through a power cord (not shown), a generator (not shown) or a battery powered supply device (not shown). Next, a user places the foodstuff within the container 14 and places the container 14 on top of and in good thermal contact with the conduction plate 18 within the housing 12 such that the container 14 is within the cooling and heating cavity 13. Next, the container lid 40 is placed on the container 14 and then the user positions the lid 16 to enclose the housing 12. Through various controls on a display or control interface 50, as seen in FIG. 3 and described in detail below, the user sets the desired settings for which the at least one cooling element 22 will cool the foodstuff within the container 14 for a desired time and, once that time is reached, the heating element 20 will begin to heat and cook the foodstuff within the cooling heating cavity 13. Alternative, the user may place already cooled or chilled foodstuff, such as from a refrigerator (not shown) in the kitchen appliance 10 and, through the various controls (not shown), begin heating or cooking the foodstuff immediately. Then, after cooking is complete, the foodstuff may be cooled to prevent over-cooking and/or to preserve the foodstuff.

During operation of the kitchen appliance 10 the heat sink 24 will absorb expelled heat from either the second, lower surface 22b of the cooling element 22 or from the heat produced from the heating element 20. The fan 26 will then either expel the heat absorbed by the heat sink 24 through the base 12a of the housing 12 and out to the exterior environment of the kitchen appliance 10 or directed moving air across the heat sink 24 to dispel hot or relatively warm air that accumulates in or around the heat sink 24. Thus, the present invention of the kitchen appliance 10 allows a user to cool and preserve foodstuff within the kitchen appliance 10 for an extended period of time and later begin heating and/or cooking foodstuff within the kitchen appliance 10 to prepare the food stuff for dinner or a meal. Alternatively, the kitchen appliance 10 allows a user take already cooled foodstuff, such as from a refrigerator, and begin heating or cooking the foodstuff immediately and after cooking is complete, the foodstuff may be cooled to prevent over-cooking and/or to preserve the foodstuff.

Figure 4:
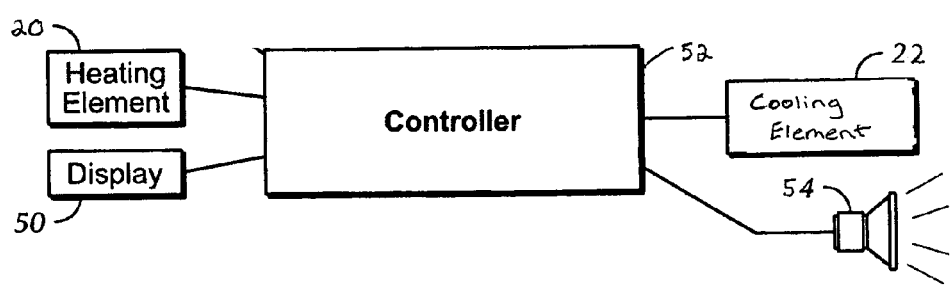
FIG. 4 is a schematic block diagram of a controller and related components of the kitchen appliance shown in FIG. 1.

Referring to FIGS. 3 and 4, the display or control interface 50 is preferably fixedly mounted to an exterior surface of the housing 12 and communicates with a controller 52 within the housing 12 to operate the kitchen appliance 10. The controller 52 is preferably mounted to the housing 12 for controlling operation of the kitchen appliance 10 in at least two operating modes. In the preferred embodiment, the controller 52 is comprised of a programmable controller and may be comprised of an application-specific integrated circuit (ASIC) that controls operation of the kitchen appliance 10 in at least two modes, namely a manual operation mode and a program operation mode. The controller 52 is not limited to being comprised of the programmable controller or the ASIC and may be comprised of nearly any variety of controller, such as a microprocessor, that is able to control the kitchen appliance 10 as will be described in greater detail below, and withstand the normal operating conditions of the kitchen appliance 10. The display 50 is preferably comprised of an on/off switch 56, a BACK switch 58, a SELECT switch 60 having a left indication button 60(a) and a right indication button 60(b), an ENTER button 62 and a display screen 64. It is understood by those skilled in the art that the display 50 is not limited to the inclusion of each of the above-mentioned buttons or the display screen 64 and may be modified without departing from the spirit and scope of the present invention. Each of the above-mentioned buttons is in communication with the controller 52 for directing the controller 52 to control the kitchen appliance 10 in one of the operating modes or to perform other related functions.

Referring to FIGS. 1-4, to operate the kitchen appliance 10 in either of the operating modes, uncooked foodstuff is positioned within the container 14 and the container 14 is positioned within the cooling and heating cavity 13. The kitchen appliance 10 is powered and a user presses the on/off button 56. When the on/off button 56 is depressed, the display screen 64 prompts a user to select an operating or cooking mode by showing the phrase, "SELECT COOKING MODE" on the top line of the display screen 64. On the lower line of the display screen 64 the words "PROGRAM" and "MANUAL" are displayed. The SELECT buttons 60 are used to highlight the desired mode. Pressing the ENTER button 62 selects the highlighted mode and the user continues setting the kitchen appliance 10 per the prompts of the PROGRAM or MANUAL modes. If no mode is selected in 30 seconds from when the on/off button 56 is depressed, the kitchen appliance 10 will switch to the off state and the display screen 64 will be de-energized. At any time in the set up of an operating or a cooking cycle, the BACK button 58 may be pressed to go back to the previous input display to make a change. In doing so, the previously selected setting will be displayed as a default. The ENTER button 62 is then used to continue forward again through the input sequence.

Manual Operation Mode

The manual operation mode allows the user or consumer to operate the kitchen appliance 10 either in a relatively low temperature, such as a KEEP WARM setting, a slightly higher temperature, such as a LOW temperature setting, or a higher temperature setting, such as a HIGH temperature setting. In the manual operation mode, the kitchen appliance 10 will automatically shut off after 14 hours of being energized. However, it is understood by those skilled in the art that the kitchen appliance 10 may be automatically shut off after fewer or more than 14 hours without departing from the spirit and scope of the present invention. Further, it is understood that the kitchen appliance 10 of the present application is not limited to the inclusion of an automatically shut off feature.

In the manual operation mode, the at least one cooling element 22 is not utilized to cool the cooling and heating cavity 13. When the manual operation mode is selected by the user, the display screen 64 will display MANUAL MODE SELECTED on the top line for three seconds. Next, the display screen 64 will display SELECT HEATING SETTING on the top line and will display MANUAL: HIGH, LOW, WARM on the bottom line. The user then actuates the SELECT button 60 to highlight the desired heating setting. When the ENTER button 62 is pressed, or when there is 20 seconds of idle time since the user last actuated one of the buttons, the controller 52 will start the cooking cycle by sounding a three second continuous tone via a speaker 54, displaying COOKING ON HIGH, COOKING ON LOW, or KEEPING WARM on the top line (depending on the setting selected) and energizing the heating element 20 to the proper setting. During the heating cycle, the display screen 64 will continue to display COOKING ON HIGH, COOKING ON LOW, or KEEPING WARM on the top line and ELAPSED TIME on the bottom line followed by the elapsed time since start of heating. The display 50 will update the time every minute.

During the heating cycle, pressing the ENTER button 62 once will allow the user to change the heating setting. Upon pressing the ENTER button 62, the display screen 64 will display CHANGE SETTING TO: on the top line and display MANUAL: HIGH, LOW, WARM on the bottom line with the current selection highlighted in inverse text. At this point the user may select a different heating setting. Pressing the ENTER button 62 is required to execute the change. If there is no input activity in 20 seconds, no change will take place and the heating will continue unchanged. When a change is made and affirmed with the ENTER button 62 the controller 52 will sound a three second continuous tone through the speaker 54, display CHANGING SETTING TO on the top line of the display screen 64 and the selected setting on the bottom line of the display screen 64 for five seconds. The controller 52 will also change the power to the heating element 20 to reflect the new heating setting and the display screen 64 will display the new heat setting. It is important to note that in the preferred embodiment, until the ENTER button 62 is pressed to execute the change, the kitchen appliance 10 will keep heating as previously programmed.

In the preferred embodiment, a 14 hour automatic shut off starts counting when the heating element 20 is first energized. Changing the heating setting at any time during the 14 hours of on time will not restart the counter or the elapsed time display. Only turning the kitchen appliance 10 off and back on will restart the 14 hour countdown timer. When the 14 hour threshold is reached, the speaker 54 will sound at least one tone, but preferably three tones, and the display screen will display COOKING FINISHED.

Program Operation Mode

Referring to FIGS. 1-4, the program operation mode allows the user to select cooking durations in high and low temperature settings and then either choose to start heating immediately or to start cooling the foodstuff first. When the program operation mode is selected the controls will display PROGRAM MODE on the top line of the display screen 64 and SELECTED on the bottom line of the display screen 64 for three seconds. Then the display screen 64 will read SET COOKING DURATION on the top line and HIGH: 00:00 HOURS on the bottom line. The left and right selection arrows 60(a), 60(b) are used to increment the time of the heating duration in 30 minute intervals from zero to 12 hours. The ENTER button 62 is then pressed to select the displayed duration. If no button is pressed in 20 seconds, the display screen 64 will flash SET COOKING DURATION until a button is pressed. After 20 seconds of flashing, the kitchen appliance 10 will revert to the state as if the kitchen appliance 10 had just been turned on. When the ENTER button 62 is pressed, the controls will skip to a "cook now" stage if the high temperature was set to 12 hours or display SET COOKING DURATION on the top line and display LOW: 00:30 hours on the lower line.

In the present embodiment, the low cook duration can be set according to the following conditions: If HIGH heat duration is set to zero, LOW heat duration can be set for a minimum of 0.5 hours to a maximum of 12 hours. Alternatively, if HIGH heat duration is set to 11 hours and 30 minutes, LOW heat duration can be set to a minimum of zero and a maximum time such that the maximum total cook time (HIGH+LOW) equals 12 hours. The ENTER button 62 is then pressed to select the displayed duration. If no button is pressed in 20 seconds, the display screen 64 will flash SET COOKING DURATION until a button is pressed. After 20 seconds of flashing, the kitchen appliance 10 will revert to the state as if the kitchen appliance 10 had just been turned on. When the ENTER button 62 is pressed, the display screen 64 will show SELECT COOKING SEQUENCE on the top line and COOL FIRST COOK NOW on the bottom line, with COOL FIRST highlighted with inverse or flashing text. The SELECT buttons 60 are used to move the highlight to the desired operation sequence. After pressing the ENTER button 62, the controls continue in either a "cook now" mode or a "cool first" mode, as described in greater detail below.

"COOK NOW"

The COOK NOW mode allows the user to start heating immediately for durations previously selected. The kitchen appliance 10 will automatically shut off after 16 hours of being energized. In the COOK NOW mode, the at least one cooling element 22 will not be utilized. When the COOK NOW is selected, the display screen 64 will show COOK NOW SEQUENCE on the top line and SELECTED on the bottom line for three seconds. The heating or cooking cycle will begin by sounding a three second continuous tone via the speaker 54, the display screen 64 will show COOKING ON HIGH or COOKING ON LOW on the top line (depending on setting selected), the heating element 20 will be energized to the proper setting, and the display screen 64 will read HH:MM HOURS REMAIN on the bottom line, where HH:MM is the total cooking duration (HIGH+LOW) selected in hours and minutes. No changes are allowed to be made to settings unless the kitchen appliance 10 is turned off and restarted.

During HIGH cooking, the display screen 64 will continue to display COOKING HIGH on the top line and update the time remaining for every minute. When the selected HIGH heating time is reached, the controls switch to a keep warm or low heating duration if LOW heating duration is set to zero. Alternatively, the controls switch to LOW heating mode by sounding one short tone and switching power to LOW for the user selected duration. Then, the top line of the display screen 64 to will read COOKING LOW and the controls will continue to update the remaining time on the display screen 64.

When the end of the heating time is reached, the controls will sound three tones via the speaker 54, switch power to a keep warm setting and display KEEP WARM on the top line of the display screen 64 and display FOR 00:00 HOURS on the bottom line at the display screen 64. The elapsed time will be updated every minute. The kitchen appliance 10 preferably will continue to operate at the keep warm setting for the balance of 16 hours from when the heating unit 20 was first energized. When the 16 hour threshold is reached, the controls will sound three tones, de-energize the heating element 20 and display COOKING FINISHED on the display screen 64.

"COOL FIRST"

The cool first mode allows the user to select what time the foodstuff or meal will be ready and the kitchen appliance 10 will keep the food load cool until heating begins. After heating is complete the kitchen appliance 10 will shift to warm, or a relatively low heat, for up to four hours and then automatically shut off. When COOL FIRST is selected, the display screen 64 will display COOL FIRST SEQUENCE, on the top line and SELECTED on the bottom line for three seconds and then display SET CURRENT TIME on the top line and display OF DAY: 12:30 AM on the bottom line. The "12" will be highlighted by inverted text and the SELECT button 60 can be used to scroll through 12 hours, one hour at a time. Pressing the ENTER button 62 sets the hours. At this point the controls will un-highlight the hours and highlight the minutes. Then, the SELECT buttons 60 can be used to scroll through the minutes. Pressing and releasing the SELECT buttons 60 will increment or decrement the time by one minute. By pressing the ENTER button 64 the minutes will be set and the controller 52 will un-highlight the minutes and highlight the AM. The SELECT buttons 60 can be used to toggle between AM and PM on the display screen 64.

Once time has been set in accordance with the above procedures, the clock (not shown) will maintain the current time (even when switched off) as long as the kitchen appliance 10 is operatively connected to a power source, such as a conventional power outlet. When the ENTER button 62 is pressed, the controller 52 will calculate a default finish time. The default finish time equals the current time+HIGH cooking duration+LOW cooking duration+one hour (minimum, after the end of the cooling sequence). This is the earliest time the kitchen appliance 10 can be programmed to be finished with heating. The display screen 64 will show SET FINISH TIME on the first line and display default finish time as HH:MM, followed by AM or PM and TODAY or TOMORROW. If this default time is after midnight of the current day, TOMORROW will display after AM/PM.

The user can then set the desired finish time using the SELECT buttons 60. For example, hours will be set first, then after the ENTER button 62 is pressed minutes can be set similarly. Preferably, minutes are set in 15 minute increments and time cannot be set less than the calculated default finish time initially displayed. As in all modes, before the ENTER button 62 is pressed, the BACK button 58 may be used to navigate to previous menu screens to change or check settings. When the ENTER button 62 is pressed, the controller 52 will sound a three second continuous tone via the speaker 54, display COOLING in the top line of the display screen 64, display FINISH TIME: HH:MM AM or PM on the bottom line of the display screen 64 and energize the at least one cooling element 22 for cooling. In the preferred embodiment, no changes are allowed to be made once the kitchen appliance 10 has started unless it is turned off and restarted. During cooling, the bottom line of the display screen 64 will alternate between FINISH TIME: HH:MM AM or PM and FINISH TIME: TODAY or TOMORROW in five second intervals.

Once the controller 52 determines when heating should begin, the speaker 54 will sound three tones, the display screen 64 will display COOKING ON HIGH or COOKING ON LOW on the top line (depending on setting selected), the heating element 20 will be energized to the proper setting and the display screen 64 will display HH:MM HOURS REMAIN on the bottom line, where HH:MM is the total heating duration (HIGH+LOW) selected in hours and minutes and updated every minute. If both stages of heating were selected, the speaker 54 will sound one short tone when power is switched from HIGH to LOW. The display screen 64 will continue displaying COOKING ON LOW and updating the remaining total heating time.

When the heating time has elapsed, the speaker 54 will sound three tones, the controller 52 will switch power to the keep warm setting, the display screen 64 will display KEEP WARM on the top line and FOR 00:00 HOURS on the bottom line. The elapsed time on the KEEP WARM setting (shown on the bottom line of the display screen 64), will update every minute. The kitchen appliance 10 shall continue to operate at the keep warm setting for a total of four hours from start of the keep warm setting. When the four hour threshold is reached, the speaker 54 will sound three tones and the display screen 64 will display COOKING FINISHED.

It will be appreciated by those skilled in the art that changes can be made to the embodiment described above without departing from the broad of concept thereof. For example, the display 50 is not limited to the inclusion of the specific buttons described above or to any buttons at all as long as the display 50 allows the user to operate the kitchen appliance 10 in the desired operating mode. Further, the kitchen appliance 10 is not limited to the specific order of operations, as described above, and may be formatted to operate in virtually any mode or configuration without departing from the broad inventive concept thereof. It is understood, therefore, that this invention is not limited to the particular embodiment disclosed but is intended to cover modifications within the spirit and scope of the present invention as defined by the appended claims.

We claim:

1. A kitchen appliance for cooling and heating foodstuff, said appliance comprising:
    a housing having a base and a side wall extending therefrom to define a cooling and heating cavity therein, said housing further having a housing rim defining an opening to said cooling and heating cavity;
    a container removably mountable within said housing, said container having a generally hollow interior and a container rim defining an opening for accessing the interior thereof, said interior being capable of retaining said foodstuff therein, said container being sized and shaped to fit within said cooling and heating cavity;

a lid removably mountable to said housing rim of said housing, said lid being sized and shaped to cover said opening of said container when placed on said housing rim;

a heating element disposed within said housing sufficiently proximate said cooling and heating cavity to heat said cooling and heating cavity, wherein said heating element is a heating coil; and at least one cooling element disposed within said housing sufficiently proximate said cooling and heating cavity to cool said cooling and heating cavity.

2. The kitchen appliance of claim 1, wherein said at least one cooling element is a thermal electric cooling module.

3. The kitchen appliance of claim 2, wherein said at least one cooling element is comprised of two separate thermal electric cooling modules.

4. The kitchen appliance of claim 1, wherein the lid includes a lid hinge on an outer edge thereof for pivotal engagement of said lid with said housing rim.

5. The kitchen appliance of claim 1, further comprising:

a conduction plate disposed within said housing, said conduction plate having a first, upper surface and a second, lower surface;

wherein said heating element and said at least one cooling element are each in facing engagement with said second surface of said conduction plate and said container is in facing engagement with said first surface of said conduction plate when said container is placed within the cooling and heating cavity of said housing.

6. The kitchen appliance of claim 1, further comprising: a heat sink to remove heat produced from said cooling element; and a fan to dispel relatively warm air that accumulates in or around the heat sink.

7. A kitchen appliance for cooling and heating foodstuff, said appliance comprising:

a housing defining a cooling and heating cavity therein;

a container removably mountable within said cooling and heating cavity, said container being capable of retaining said foodstuff therein;

a conduction plate disposed within said housing; said conduction plate in thermal engagement with said container when said container is mounted within said housing;

a heating element disposed within said housing and in thermal engagement with said conduction plate to heat said cooling and heating cavity, wherein said heating element is a heating coil; and at least one cooling element disposed within said housing and in thermal engagement with said conduction plate to cool said cooling and heating cavity.

8. The kitchen appliance of claim 7, wherein said at least one cooling element is a thermal electric cooling module.

9. The kitchen appliance of claim 8, wherein said at least one cooling element is comprised of two separate thermal electric cooling modules.

10. The kitchen appliance of claim 8, further comprising: a lid removably mountable to said housing; said lid encloses said container within said cooling and heating cavity of said housing when said container is positioned within said housing.

11. The kitchen appliance of claim 10, further comprising: a heat sink for absorbing heat expelled from said thermal electric cooling module; and a fan to expel heat from said heat sink away from said housing.

12. The kitchen appliance of claim 11, further comprising: insulation enclosing at least a portion of said conduction plate to maintain a desired temperature of said conduction plate.

13. A method of cooling and heating foodstuff in a kitchen appliance over a period of time, said kitchen appliance including a housing defining a cooling and heating cavity therein, a controller to control cooling and heating of said cooling and heating cavity, a display in communication with said controller, a container removably mountable within said cooling and heating cavity, said container being capable of retaining said foodstuff therein, a heating element disposed within said housing to heat said cooling and heating cavity, said heating element being a heating coil; at least one cooling element disposed within said housing to cool said cooling and heating cavity, the method including the steps of:

a) inserting foodstuff into said container;

b) positioning said container in said cooling and heating cavity;

c) selecting an operating mode on said display to operate said kitchen appliance in a program mode;

d) selecting a heating duration time on said display to operate said heating element for said heating duration time;

e) selecting an operation sequence on said display to operate said at least one cooling element before operating said heating element;

f) selecting a cooling duration time on said display to operate said cooling element for said cooling duration time;

g) automatically actuating said cooling element to cool said cooling and heating cavity for said cooling duration time;

h) automatically actuating said heating element when said cooling duration time is complete to heat said cooling and heating cavity for said heating duration time; and i) automatically cutting power to the heating element after a maximum time elapses.

14. The method of cooling and heating foodstuff in a kitchen appliance of claim 13, wherein a tone is sounded at step (i).

15. The method of cooling and heating foodstuff in a kitchen appliance of claim 13, comprising the further step of:

j) selecting one of a high heating temperature and a low heating temperature after step (d) to operate said heating element at said high or low heating temperature for said heating duration time.

* * * * *